(12) United States Patent
Thomas et al.

(10) Patent No.: US 9,850,939 B2
(45) Date of Patent: Dec. 26, 2017

(54) METHOD FOR PRODUCING A TRANSMISSION SHAFT, PREFERABLY FOR AN ACCESSORY BOX SYSTEM OF AN AIRCRAFT TURBOMACHINE

(71) Applicant: SAFRAN, Paris (FR)

(72) Inventors: Cedric Thomas, Palaiseau (FR); Patrick Dunleavy, Palaiseau (FR); Wouter Balk, Melun (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 14/764,871

(22) PCT Filed: Feb. 3, 2014

(86) PCT No.: PCT/FR2014/050189
§ 371 (c)(1),
(2) Date: Jul. 30, 2015

(87) PCT Pub. No.: WO2014/118480
PCT Pub. Date: Aug. 7, 2014

(65) Prior Publication Data
US 2015/0377282 A1 Dec. 31, 2015

(30) Foreign Application Priority Data
Feb. 4, 2013 (FR) ...................... 13 50952

(51) Int. Cl.
*B65H 81/00* (2006.01)
*F16C 3/02* (2006.01)
(Continued)

(52) U.S. Cl.
CPC .............. *F16C 3/026* (2013.01); *B29C 53/56* (2013.01); *B29C 70/16* (2013.01); *B29C 70/222* (2013.01);
(Continued)

(58) Field of Classification Search
CPC ......... F16C 3/026; B29C 53/56; B29C 70/16; B29C 70/52; B29C 70/521; B29C 70/222;
(Continued)

(56) References Cited

U.S. PATENT DOCUMENTS 4,214,932 A * 7/1980 Van Auken ............ F16C 3/026
5,363,929 A * 11/1994 Williams .................. E21B 4/02
464/181 X
(Continued)

FOREIGN PATENT DOCUMENTS

DE    10 2007 051 517 A1 *  4/2009

OTHER PUBLICATIONS

International Search Report Issued Jun. 2, 2014 in PCT/FR14/050189 Filed Feb. 3, 2014.
(Continued)

*Primary Examiner* — Gregory J Binda
(74) *Attorney, Agent, or Firm* — Oblon, McClelland, Maier & Neustadt, L.L.P.

(57) ABSTRACT

A method for producing by pultrusion a hollow main body of a rotary movement transmission shaft made of a composite material, the method including: impregnating a reinforcement; arranging a reinforcing fabric around a pultrusion chuck to wrap the pultrusion chuck, the fabric including circumferential fibers arranged in planes orthogonal to a longitudinal axis of the chuck; and then depositing the impregnated reinforcement around the reinforcing fabric.

9 Claims, 6 Drawing Sheets

(51) Int. Cl.
  *B29C 70/52*   (2006.01)
  *B29C 70/22*   (2006.01)
  *B29C 53/56*   (2006.01)
  *B29C 70/16*   (2006.01)
  B29C 53/58     (2006.01)
  B29K 63/00     (2006.01)
  B29K 105/08    (2006.01)
  B29L 31/00     (2006.01)

(52) U.S. Cl.
  CPC ............ *B29C 70/52* (2013.01); *B29C 70/521* (2013.01); *B29C 53/58* (2013.01); *B29K 2063/00* (2013.01); *B29K 2105/0809* (2013.01); *B29L 2031/75* (2013.01)

(58) Field of Classification Search
  CPC . B29C 53/58; B29L 2031/75; B29K 2063/00; B29K 2105/0809
  USPC ............ 464/181; 156/172; 264/176.1, 177.1, 264/209.1–209.4, 209.6
  See application file for complete search history.

(56) References Cited

U.S. PATENT DOCUMENTS

| | | |
|---|---|---|
| 5,698,055 A | 12/1997 | Benkoczy et al. |
| 8,834,119 B2 | 9/2014 | Balk et al. |
| 8,876,462 B2 | 11/2014 | Balk et al. |
| 2013/0011259 A1 | 1/2013 | Balk et al. |

OTHER PUBLICATIONS

French Search Report Issued Oct. 18, 2013 in French Application No. 13 50952 Filed Feb. 4, 2013.

\* cited by examiner

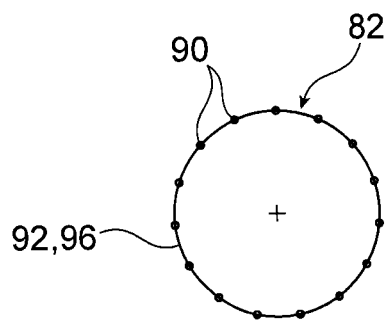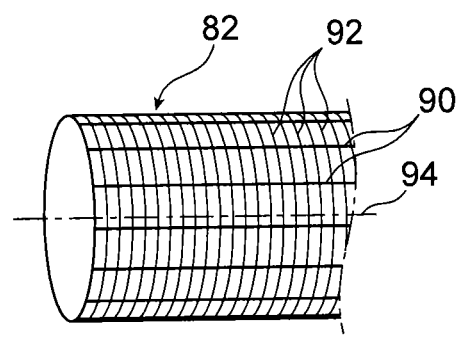
FIG.8A  FIG.8B
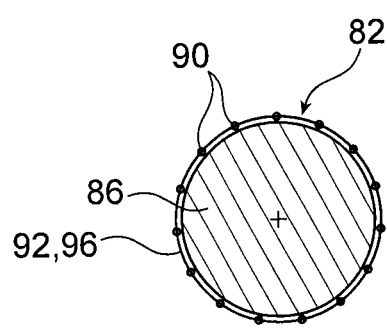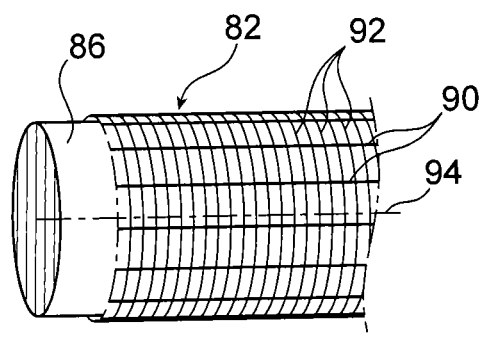
FIG.9A  FIG.9B

METHOD FOR PRODUCING A TRANSMISSION SHAFT, PREFERABLY FOR AN ACCESSORY BOX SYSTEM OF AN AIRCRAFT TURBOMACHINE

TECHNICAL FIELD

The present invention relates to the field of rotary movement transmission shaft production, preferably for accessory drive systems of an aircraft turbomachine. On the aircraft, other applications are worth considering, such as for example between an engine and an aircraft accessory, such as a trailing edge mobile flap.

The invention also applies to any other field in which such rotary transmission shafts are used, such as the naval field, for example between the engine and the propeller. The motor vehicle field may also be concerned, such as for example between the engine and the wheels.

STATE OF PRIOR ART

The accessory drive systems for an aircraft turbomachine usually comprise several gear boxes connected to each other by rotary movement transmission shafts. Generally, a radial transmission shaft connects a transfer gear box to an inner drive gear box in turn connected to a drive shaft of the turbomachine, and another longitudinal transmission shaft connects the transfer gear box to an accessory drive gear box.

The transmission shaft can be a hybrid technical solution including a main body of composite with an organic matrix, to both ends of which two metallic nosepieces are respectively mounted, conformed to cooperate with inlet and outlet members provided on the gear boxes to be connected.

In order to ensure the movement transmission, it is necessary that each nosepiece is rotatably coupled to its associated body end. To do so, different techniques are known, which are not however totally satisfactory.

A first rotational coupling technique consists in bonding the metallic nosepiece to the main body end of composite with an organic matrix. However, this technique by structural bonding is difficult to implement, and encounters certification problems.

A second solution lies in the presence of mechanical systems rotatably coupling the nosepieces onto the shaft main body. It consists for example in making the main body using braids of carbon fibers or impregnated fibers the ends of which cover a "hedgehog"-shaped nosepiece. Interlocking braids in the hedgehog's spires provides the rotational coupling function, but this technique proves to be expensive. This drawback also arises in most other solutions with mechanical systems, which can even sometime result in reducing the mechanical strength of the shaft main body, due to its perforation required for mounting such mechanical systems.

It is now considered to make a hollow main body made of composite with an organic matrix by pultrusion, and to couple therewith two nosepieces through form-fitting links. However, upon applying the torque on the metallic nosepiece, there can be a risk of deformation of the composite tube according to its thickness, likely to result in a contact loss between the composite body and the nosepiece. This contact loss can make the form-fitting link inoperative.

Such drawbacks can be found in an identical or similar way in all the other fields implementing such rotary movement transmission shafts, such as the naval and motor vehicle fields.

DISCLOSURE OF THE INVENTION

The purpose of the invention is therefore to at least partially overcome the abovementioned drawbacks, related to the prior art implementations.

To do so, the object of the invention is a method for producing by pultrusion a hollow main body of a rotary movement transmission shaft made of a composite material, the method comprising a step of impregnating the reinforcement, and:

- a step of arranging a reinforcing fabric around a pultrusion chuck so as to wrap the latter, the fabric comprising circumferential fibers arranged in planes orthogonal to a longitudinal axis of the chuck; and then
- a step of depositing the impregnated reinforcement around the reinforcing fabric.

The invention is noteworthy in that it combines the pultrusion technique with the introduction of a fabric comprising circumferential fibers perfectly adapted to best withstand the stresses of the nosepieces intended to equip this body. The invention thus provides a clever solution enabling the arrangement of fibers oriented substantially at 90° with respect to the main body axis, whereas fibers from pultrusion can usually only be deposited at an angle lower than about 45° with respect to this same axis.

Resistance to "opening" of the main body ends becomes substantially improved thanks to the presence of the reinforcing fabric, without leading to a detrimental overall weight. In other words, the invention allows a very satisfying compromise to be obtained between a reasonable overall weight and a high resistance to deformation of the main body, under the effect of the stresses applied in use by the nosepieces. In this respect, it is noted that the nosepieces can be coupled to the main body ends on an outside wall or on an inside wall of the latter. The production method is therefore preferably implemented so as to obtain a non-circular inside wall and/or outside wall, in order to enable the creation of form-fitting links with the nosepieces.

Preferably, the step of arranging the reinforcing fabric is performed by fitting this sock-shaped fabric around the chuck.

Preferably, said reinforcing fabric is deposited in a dry state around the pultrusion chuck, then impregnated with the resin of the impregnated reinforcement brought into contact therewith. The method is here further simplified, since impregnating the reinforcing fabric is astutely performed by the excess resin previously deposited on the reinforcement. Moreover, arranging this fabric on the chuck is facilitated when it is in a dry state, even if an arrangement around the chuck can be considered in an impregnated state, without departing from the scope of the invention. According to yet another alternative, a specific impregnation system could also be provided for applying resin on the fabric already threaded onto the chuck.

Preferably, said reinforcing fabric extends, in a transverse cross-section, along a closed line. As mentioned above, this is then a sort of sleeve or sock which is fitted in around the chuck. Said closed line thus has a form-fitting that of the chuck which it is intended to surround. Alternatively, the line may not be closed, but have at least two edges covering each other, again for the reinforcing fabric to have a closed transverse cross-section around the chuck. In the latter case, the envelope can be made from a fabric, for example stored as a reel, and the two opposite edges of which are gradually brought closer to finally have the fabric totally wrapping the cylindrical outside surface of the chuck.

Preferably, said reinforcing fabric is a 2D fabric with orthogonal fibers.

Preferably, said circumferential fibers of the reinforcing fabric represent more than 80% of all the fabric fibers. This enables this reinforcing fabric to be essentially dedicated to the resistance to deformation, according to the thickness direction of the hollow main body.

Preferably, said reinforcement is made from several unidirectional fibers.

Preferably, the method comprises, after the step of impregnating the reinforcement, a step of shaping of the latter during which said step of depositing the impregnated reinforcement around the reinforcing fabric is performed, as well as a step of curing the assembly formed by the reinforcement and reinforcing fabric. The die and the curing device can be elements integrated with each other, or separated elements. Moreover, the die can have several spaced apart modules in the direction of flow of the pultrusion fibers, these modules providing for example a gradual shaping of the desired shaft body.

Preferably, the method comprises, after the curing step, a step of cutting-out the obtained tubular element, so as to obtain said main body of the rotary movement transmission shaft.

The object of the invention is also a rotary movement transmission shaft, preferably intended to be interposed between an inlet member and an outlet member of an accessory drive system for an aircraft turbomachine, said shaft presenting a hollow main body obtained by the above-mentioned method, at both ends of which two conformed shaft nosepieces are respectively mounted to cooperate with said inlet member and said outlet member. Moreover, each nosepiece is rotatably coupled to its associated body end through a form-fitting link, performed from a first surface having a non-circular transverse cross-section made on the main body end and receiving the associated nosepiece.

This configuration supplies a reliable solution in terms of bending strength and rotational coupling of the main body with the nosepieces. Indeed, this rotational coupling, based on the principle of a form-fitting link, proves to be simple, efficient and inexpensive, without diminishing the mechanical strength of the shaft main body. Particularly, at the nosepieces, the reinforcing fabric having circumferential fibers enables a strong limitation of the "opening" risks of the main body under the effect of stresses applied by the nosepieces having a fitting form.

It is noted that the nosepieces can be fixed to the main body, with the sole purpose of ensuring their retention in longitudinal tension and preventing their escape. The used fixing means are then much less constraining than those met in prior art, given that they are in no way dedicated to the rotational coupling. Preferably, these fixing means are glue.

Moreover, the first surface of the form-fitting link is easy to make with the pultrusion method specific to the present invention, this technique being also referred to as "pull extrusion". This is in particular the case when this first surface has an oval-shaped transverse cross-section, or is of a polygonal curve or polygonal profile-type.

As mentioned above, the invention is not limited to an application to an accessory drive system for an aircraft turbomachine, but can also be integrated in any other system requiring such a rotary movement transmission shaft. It can be for example a shaft between an engine and an aircraft accessory, such as a trailing edge mobile flap, or a shaft for the naval field, for example between the engine and the propeller, or even a shaft for a motor vehicle, for example between the engine and the wheels.

Preferably, said form-fitting link is also performed from a second surface having a non-circular transverse cross-section made on the nosepiece and cooperating with said first surface, the shape of this second surface being then preferably identical to that of the first surface. In this case, the first and second surfaces of the link preferably have substantially identical dimensions, in order to enable their interlocking with preferably only one assembly clearance. A cold mounting can also be considered, for example with nitrogen. Other forms could also be considered for the second surface, without departing from the scope of the invention, but always so as to obtain a form-fit ensuring the rotational coupling.

Preferably, said first surface made on the main body end is an inside surface of the shaft, thus implying that the nosepiece carrying said second surface is provided to be accommodated within its associated shaft end. Alternatively, the first surface could be an outside surface of the shaft. The nosepiece carrying the second surface would then be provided to be accommodated around its associated shaft end.

Preferably, the inside wall and the outside wall each have an oval-shaped or a polygonal profile-type transverse cross-section. In this case, both walls are preferably centered and the thickness of the shaft body, defined between both walls, is substantially constant. The shaft body is consequently here in the form of a tube with an oval cross-section. Nevertheless extra thicknesses could also be provided as a function of the encountered needs.

Similarly, it could also be provided that only one of the inside and outside walls has an oval shaped transverse cross-section or is of the polygonal profile-type, especially in order to create said first surface intended to cooperate with the nosepiece, the other one of both walls having then preferably a circular cross-section. In this case, the thickness of the hollow bodies is not uniform. One of the main advantages of the pultrusion technique is that it can ensure a homogeneous volume distribution of the fibers, in spite of the variation in the thickness along the cross-section.

Preferably, each nosepiece moreover has a surface with spline(s)/groove(s) intended to cooperate with its associated inlet/outlet member. It can equally be a male or female surface, according to the nature of the surface of the inlet/outlet member with which the nosepiece has to cooperate.

As indicated above, said shaft main body is partly made by pultrusion, a technique which is particularly interesting because of its low implementation cost and its capacity to produce pieces which have both a coupling strength, in particular thanks to the fibers deposited with a 45° angle with respect to the longitudinal axis of the tube, and a bending strength, in particular thanks to the fibers deposited along the longitudinal axis of the tube. This is particularly the case when the obtained piece has an oval shape or a polygonal profile. The pultrusion technique also enables accurate thicknesses to be obtained, which are suitable for a proper balancing of the shafts.

The object of the invention is also an accessory drive system for an aircraft turbomachine comprising at least one rotary movement transmission shaft such as described above, interposed between an inlet member and an outlet member of said system.

Preferably, it comprises an inner drive gear box intended to be connected to a drive shaft of the turbomachine, a transfer gear box, an accessory drive gear box, a first transmission shaft connecting the inner drive gear box and the transfer gear box, and a second transmission shaft connecting the transfer gear box and the accessory drive gear box, at least one of the first and second transmission shafts being a shaft such as abovedescribed.

The object of the invention is finally an aircraft turbomachine comprising such an accessory drive system.

Further advantages and features of the invention will appear upon reading the non-limiting detailed description hereinafter.

BRIEF DESCRIPTION OF THE DRAWINGS

This description will be made in relation to the accompanying drawings among which;

FIG. 8A is a cross-section view taken along the line VIII-VIII of FIG. 7, whereas FIG. 8B is a side view of that of FIG. 8A;

FIG. 9A is a cross-section view taken along the line IX-IX of FIG. 7, whereas FIG. 9B is a side view of that of FIG. 9A;

DETAILED DESCRIPTION OF PREFERRED EMBODIMENTS

Figure 1:
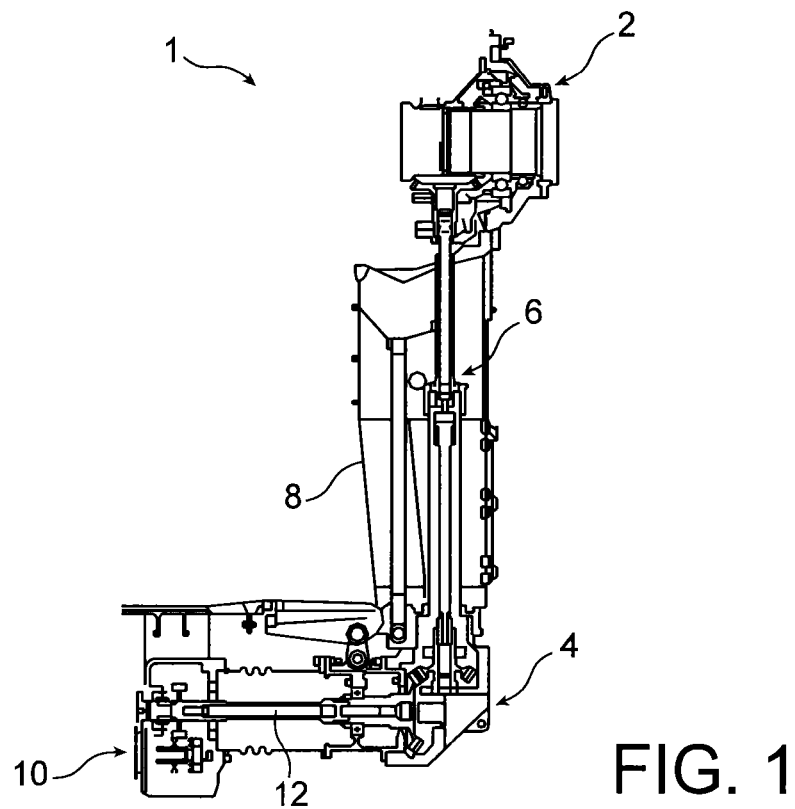
FIG. 1 represents a front view of an accessory drive system for an aircraft turbomachine, according to a preferred embodiment of the present invention.
Figure 2:
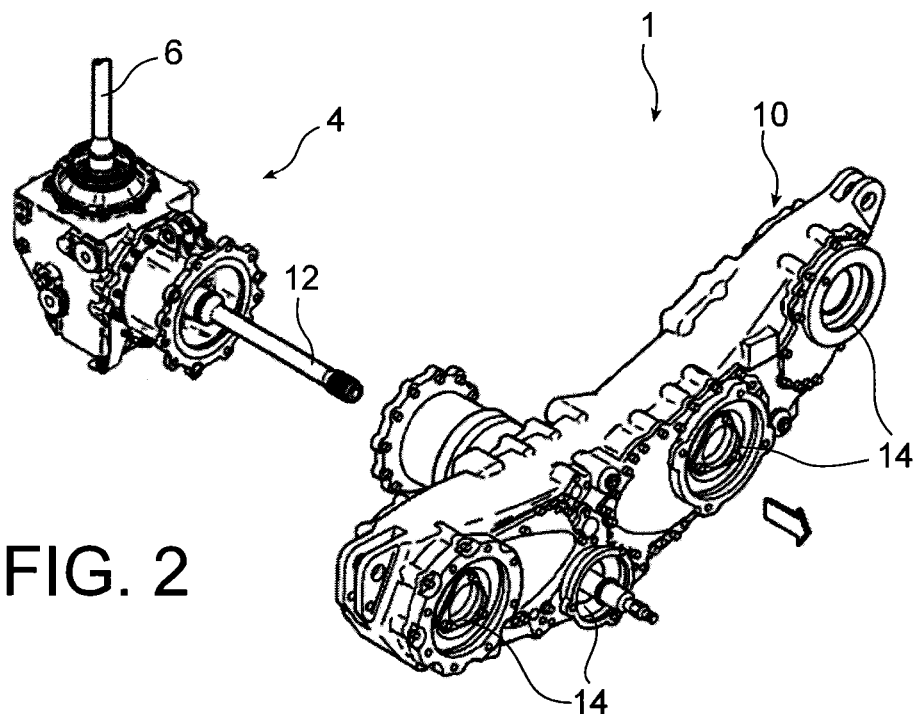
FIG. 2 represents a perspective view of a part of the accessory drive system shown in the previous Figure.

With reference to FIGS. 1 and 2, an accessory drive system 1 for an aircraft turbomachine is represented, for example a twin spool turbofan engine.

In a known manner, part of the power generated by the turbofan engine is bled-off to power different accessories equipping this turbofan engine, as well as the aircraft equipments.

Part of this bleed is generally performed mechanically on the high pressure body shaft. To do so, the system 1 first includes an inner drive gear box 2, driven by a pinion integral with the high pressure body shaft. The gear box 2 is connected to another transfer gear box 4 by a rotary movement transmission shaft 6, which extends radially through an arm 8 of the turbofan engine intermediate case, intended to be fitted by the secondary flow. Optionally, the shaft 6 can be made into two portions mounted on one another, and following each other along the radial direction.

Then, the transfer gear box 4 is connected to an accessory drive gear box 10 by another rotary movement transmission shaft 12, which extends longitudinally, that is parallel to the longitudinal axis of the turbofan engine, forwards. The gear box 10, also referred to as "Accessory Gear Box" (AGB), usually drives and supports different accessories, for example a generator, a starter, an alternator, fuel and oil pumps, etc. Platforms 14 for mounting and driving these accessories are thus provided on this gear box 10, which conventionally extends circumferentially around the fan case, over a restricted angular sector.

Thus, the drive system 1 enables the accessories to be driven by the high pressure body shaft, via the gear boxes 2, 4, 10 and the shafts 6, 12.

Figure 3:
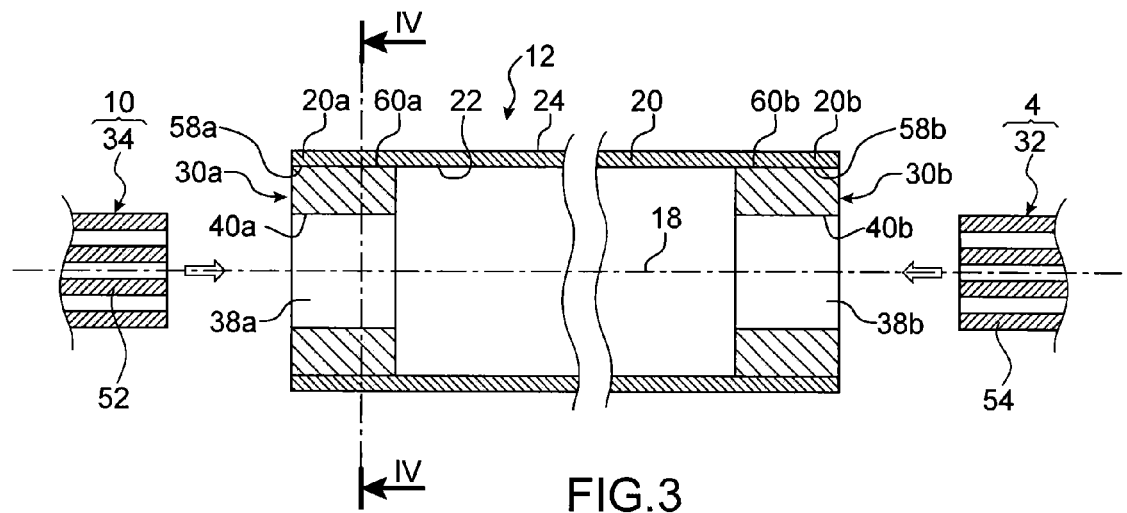
FIG. 3 represents a longitudinal cross-section view of a transmission shaft specific to the present invention, equipping the accessory drive system shown in the previous Figures.
Figure 4:
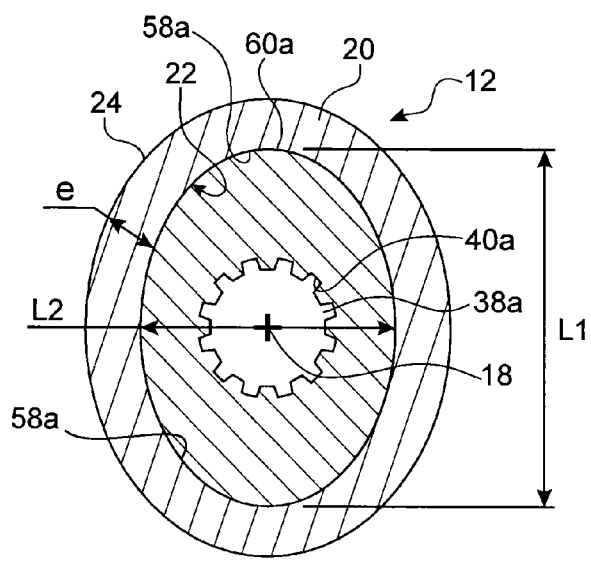
FIG. 4 represents a transverse cross-section view of the transmission shaft, taken along the line IV-IV of FIG. 3.

With reference now to FIGS. 3 and 4, the transmission shaft 12 is represented in a more detailed way, which shows a design specific to the present invention, and the production method of which will be described thereafter. Of course, an identical or similar shaft could be provided to make the radial shaft 6, or also to make each of both its sections when the same is designed in two parts.

The shaft 12, having a longitudinal axis 18, comprises a hollow main body 20 being in the form of a tube preferably extending throughout the shaft, the length of which is for example between 215 mm and 1,250 mm. This tube assumes a generally oval shape, and more particularly, has an inside wall 22 as well as an outside wall 24 both centered on the axis 18, and with an oval-shaped transverse cross-section, preferably identical in any cross-section plane.

The large dimension L1 of the inside wall 22 is for example between 20 and 35 mm, whereas its small dimension L2 is preferably between 16 and 31.5 cm, the ratio of L1 to L2 being in turn between 1.1 and 1.3.

The thickness "e" of the tube 20 is preferably constant throughout its length and all around the axis 18, for example in the order of 2 to 5 mm for a shaft having oval inner and outer cross-sections. It will be non-constant for a shaft having an oval or polygonal inner cross-section or having a circular outer cross-section, or conversely. However, the volume distribution of the fibers will remain homogeneous.

The main body 20 is produced by pultrusion, as will be detailed thereafter. At each one of its ends 20a, 20b, the body 20 accommodates a metallic shaft nosepiece 30a, 30b intended to be rotatably coupled with a member of the system 1. More precisely, the nosepiece 30b is intended to cooperate with an outlet member 32 of the transfer gear box 4, whereas the nosepiece 30a is intended to cooperate with an inlet member 34 of the accessory drive gear box 10. Consequently, the rotary movement of the outlet member 32 of the gear box 4 is transmitted to the nosepiece 30b which in turn transmits it to the body 20, by form-fit. Similarly, the body 20 rotatably drives along the axis 18 the other nosepiece 30a, which in turn transmits the rotary movement to the inlet member 34 of the gear box 10.

In the preferred embodiment represented in FIGS. 3 and 4, each nosepiece 30a, 30b is indeed conformed to cooperate with its associated member 34, 32 by having an opening 38a, 38b delimited by an inside surface 40a, 40b having splines or grooves, and cooperating with an outside surface 52, 54 having a fitting form provided on its associated member 34, 32. It is noted that each opening 38a, 38b is centered on the axis 18, and is a through opening or not according to the direction of this axis. Once the splined surfaces are fitted in twos, they can then fulfill their function of rotatably coupling the members 32, 34 with the nosepieces 30b, 30a.

Cooperation between a nosepiece and its associated end of the shaft main body is the same for both nosepieces. Consequently, throughout the following description, only the nosepiece 30a and its associated end 20a will be described. In the Figures, the reference numerals comprising the letter "b", attached to the nosepiece 30b and the end 20b, consequently correspond to elements identical or similar to those of the nosepiece 30a and the end 20a bearing the same reference numerals, with the letter "a".

The nosepiece 30a and the end 20a are rotatably coupled along the axis 18 through a form-fitting link, obtained by a first surface 58a corresponding to the end of the inside wall 22 of the body 20, and therefore having an oval shaped transverse cross-section. The form-fitting link also integrates a second surface 60a, also having an oval shaped transverse cross-section, provided at the outside wall of the nosepiece 30a. Similar dimensions for the surfaces 58a, 60a enable the nosepiece 30a to be perfectly interlocked in the end 20a, and provide the desired rotational coupling.

Indeed, only one assembly clearance can be kept between both surfaces 58a, 60a. Nevertheless, in the preferred case where the nosepiece 30a is intended to be bonded on the end 20a to prevent its escape, the clearance can be accordingly enlarged. A cold mounting can also be considered, by a nitrogen cooling of the nosepiece.

Production of the transmission shaft 12 is first implemented by the separately manufacturing its body 20 and its nosepieces 30a, 30b. The latter are preferably made of metal, manufactured by machining. The body 20 is made of a composite material having an organic matrix, by pultrusion using a method specific to the present invention and which will be described latter. Once obtained, the nosepieces 30a, 30b are accommodated and bonded in their respective ends 20a, 20b, before the shaft is then installed in the drive system 1, on the inlet 34 and outlet 32 members. As mentioned above, it is noted that the arrangement of the nosepieces can be made in a cold way, preferably by cooling these nosepieces with nitrogen before sliding it into the main body ends.

Figure 5:
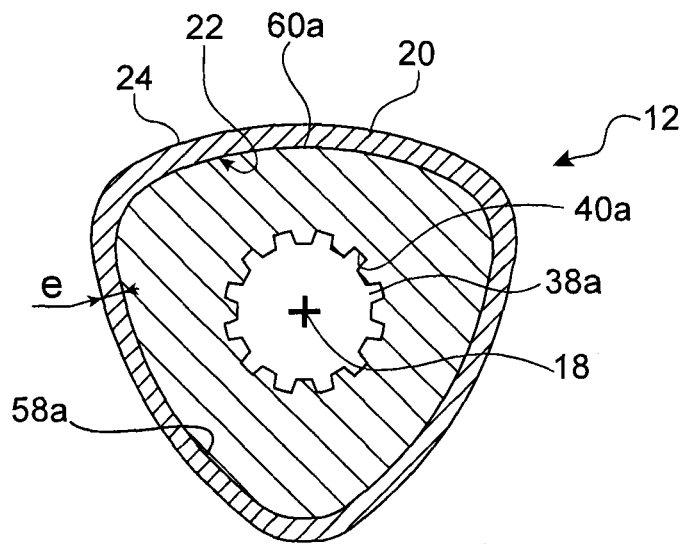
FIG. 5 represents a view similar to that of FIG. 4, with the transmission shaft being in the form of another preferred embodiment of the invention.

FIG. 5 shows another preferred embodiment of the present invention, in which the walls 22, 24 and the first and second surfaces 58a, 60a all have a polygonal profile, here with three lobes. The retained profile is of the type standardized under the reference P3G-DIN 32711, represented by the line 70 in FIG. 6B. As can be seen in this Figure, the three vertices form lobes disposed at 120°, the most of centered point of each lobe being inscribed on a same circle.

Figure 6A:
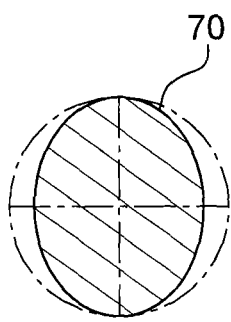
FIGS. 6A to 6D show different polygonal profiles likely to be adopted for implementing the embodiment shown in FIG. 5.
Figure 6B:
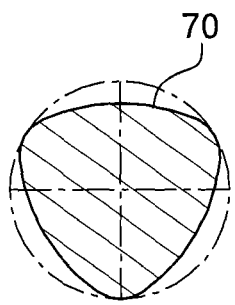
Figure 6C:
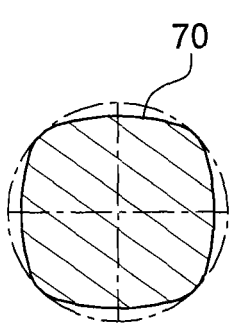
Figure 6D:
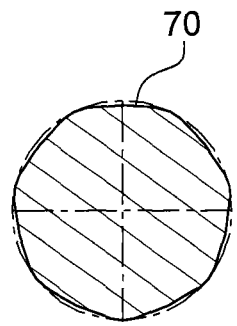
Figure 7:
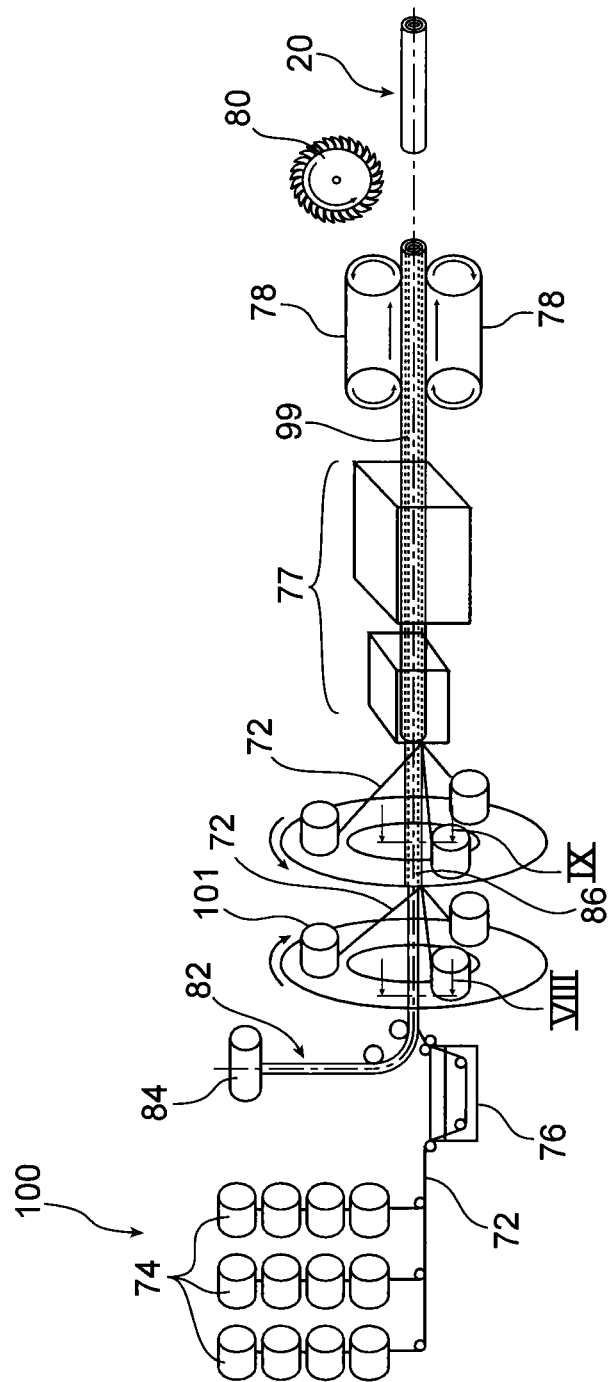
FIG. 7 represents a schematic side view of an equipment for implementing a method for producing a transmission shaft shown in the previous Figures, the method being in the form of a preferred embodiment of the invention.

Other polygonal profiles can also be considered, whether they are standardized or not, for example with two lobes such as the one shown in FIG. 6A and similar to an oval transversal cross-section shape, or even with four or seven lobes as respectively represented by the line 70 in FIGS. 6C and 6D. In the case of the polygonal profile with four lobes, it can be the one standardized under the reference P4C-DIN 32712.

With reference now to FIGS. 7 to 10, an equipment 100 for producing the hollow main body 20 shown in FIGS. 3 and 4 is represented. This production method first involves the pultrusion technique, which can be briefly summarized as follows. A reinforcement 72, here fibers packaged in reels 74, is impregnated with resin by passing through a bath 76 and pulled across a long heated die 77 which controls the resin content and determines the shape of the cross-section. Passing through this oven causes the thermosetting resin to be polymerized and gives its final shape to the shaft main body. Pulling is made by dedicated means such as rollers 78 provided upstream the heated die 77, rotating rollers ensuring by friction that the obtained tubular element 99 is set in motion. The latter is then cut at the desired length by suitable means 80, for obtaining the bodies 20.

One of the features of the invention lies in associating this pultrusion technique with the arrangement of a reinforcing fabric 82, preferably a 2D fabric being in the form of a sleeve or a sock. Just like the fibers of the reinforcement 72, the fibers of the fabric 82 are for example glass fibers and/or carbon fibers. The reinforcing fabric 82 is also preferably packaged in reel 84.

The method according to the invention provides a step of arranging this reinforcing fabric 82 around a pultrusion chuck 86, by fitting the sock-shaped fabric on the chuck. In this respect, it is noted that the chuck 86 and the reinforcing fabric 82 have a transverse cross-section having the same shape, corresponding to the shape of the desired inside wall for the shaft main body. Thus, the fabric 82 at a dry state is continuously unwound from the reel 84 and then arranged around the chuck 86, its setting in motion being provided by the pulling rollers 80, as will be explained hereafter. FIGS. 8A and 8B show the fabric 82 before it wraps and fits snugly the chuck throughout its outside surface, whereas the FIGS. 9A and 9B show the fabric 82 after this wrapping. Besides, in FIGS. 9A and 9B, the 2D fabric is shown to have longitudinal fibers 90 parallel to the longitudinal axis 94 of the chuck, as well as circumferential fibers 92 arranged in planes orthogonal to this same axis 90, that is forming an angle of about 90° with this axis 94, in side view. Among these orthogonal fibers 90, 92, the circumferential fibers are the most numerous, their proportion being greater than 80%, or even equal to or greater than 85% of all the fabric fibers 82, in volume and in weight.

As can be seen in FIGS. 8A to 9B, in a transverse cross-section, the sock-shaped fabric 82 extends along a closed line 96, similar to one of the circumferential fibers 92, having here an oval shape.

The fibers 72 of the reinforcement are in turn unwound and then, after having been impregnated with resin in the bath 76, brought on a removal device 101 enabling them to assume several different orientations in the produced element. It is noted that the resin of the bath 76 can be any resin conventionally used for the pultrusion technique, such as polyester, polyurethane or epoxide resin. The chosen resin is here preferably a thermosetting resin of the epoxide type.

Figure 10:
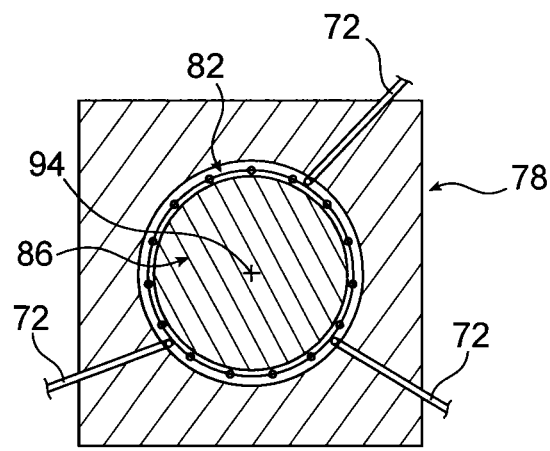
FIG. 10 is a schematic transverse cross-section view of the equipment shown in FIG. 7, taken at the inlet of the die.

After this step of impregnating the reinforcement, a step of shaping the latter is performed, by introducing the fibers 72 in the heating die 77, as is schematically represented in FIG. 10.

During this shaping step, the fibers 72 are pressed against the pultrusion chuck 86, around the reinforcing fabric 82 already arranged on the latter. Upon depositing the impregnated reinforcement 72 on the dry fabric 82, the latter thus advantageously becomes impregnated by the excess resin present on the reinforcement. Also, in the heating die 77, the fabric 82 and the conventional pultrusion reinforcement 72 form a single impregnated assembly which undergoes a curing step, in order to form an integral tubular element 99 intended to make up the shaft main body after sectioning. It is this element 99 which is in contact with the rollers 78 and which is therefore driven upstream, bringing with it the reinforcement 72 and the fabric 82 which consequently automatically unwound under the effect of the traction performed by the cured tubular element 99.

Figure 11:
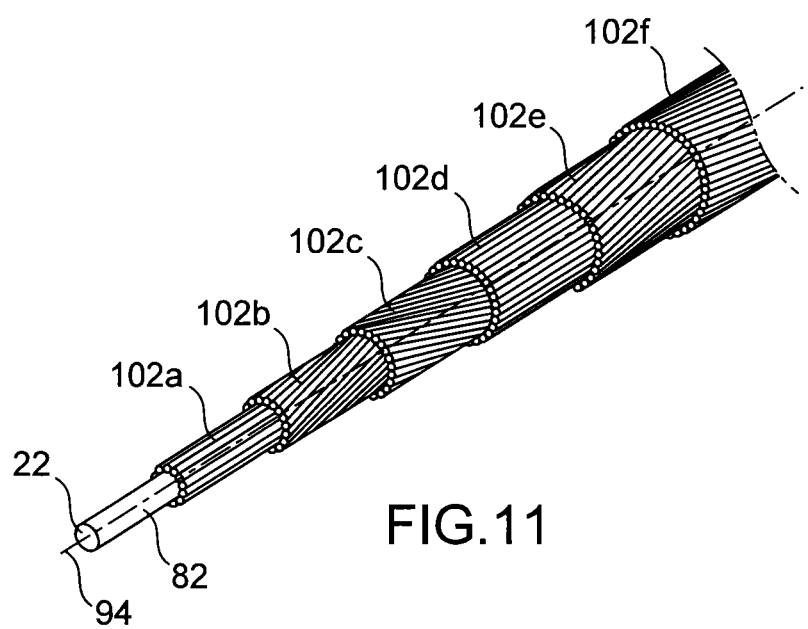
FIG. 11 is a schematic view depicting the various fiber layers deposited for obtaining the shaft main body at the outlet of the equipment.

As mentioned above, the unidirectional fibers 72 of the reinforcement can be deposited with angles different with respect to the axis 94. FIG. 11 shows an example embodiment in which the inside layer is of course made using the reinforcing fabric 82, the inner surface of which is intended to form the inside wall 22 of the shaft main body 20. Then, there are six layers stacked upon one on other, the first layer 102*a* being longitudinal, that is having fibers parallel to the axis 94 of the obtained cured element. The second layer 102*b*, covering the first layer 102*a*, has in turn fibers tilted by an angle lower than 45° with respect to the axis 94, in a given direction, and covered by a third layer 102*c* also having fibers tilted by an angle lower than 45° with respect to the axis 94, but in the direction opposite to said given direction. The absolute value of the tilt angle of the fibers of the second and third layers 102*b*, 102*c* is preferably identical. Then, this stacking of three layers 102*a*, 102*b*, 102*c* is covered by an identical stacking of three other layers 102*d*, 102*e*, 102*f*, the sixth layer 102*f* being intended to make up the outside wall of the shaft main body.

Of course, various modifications can be made by those skilled in the art to the invention which has just been described, only by way of non-limiting examples.

The invention claimed is:

1. A method for producing by pultrusion a hollow main body of a rotary movement transmission shaft made of a composite material, the method comprising:
impregnating a reinforcement with a resin, the reinforcement being made from plural unidirectional fibers;
arranging a reinforcing fabric around a pultrusion chuck to wrap the pultrusion chuck, the reinforcing fabric comprising circumferential fibers arranged in planes orthogonal to a longitudinal axis of the pultrusion chuck; and then
depositing the impregnated reinforcement around the reinforcing fabric such that each of the unidirectional fibers of the impregnated reinforcement is put into contact with the reinforcing fabric arranged around the pultrusion chuck.

2. The method according to claim 1, wherein the arranging the reinforcing fabric is made by fitting in a sleeve-shaped reinforcing fabric around the pultrusion chuck.

3. The method according to claim 1, wherein the reinforcing fabric is deposited in a dry state around the pultrusion chuck, and then impregnated with a resin of the impregnated reinforcement brought into contact therewith.

4. The method according to claim 1, wherein the reinforcing fabric is a 2D fabric with orthogonal fibers.

5. The method according to claim 1, wherein the circumferential fibers of the reinforcing fabric represent more than 80% of all fabric fibers.

6. The method according to claim 1, further comprising, after the impregnating the reinforcement, a shaping of the reinforcement during which the depositing the impregnated reinforcement around the reinforcing fabric is performed, and curing an assembly formed by the reinforcement and the reinforcing fabric.

7. The method according to claim 6, further comprising, after the curing, cutting-out an obtained tubular element, to obtain a main body of a rotary movement transmission shaft.

8. The method according to claim 1, wherein the reinforcement includes plural layers in which all of the fibers in each layer is unidirectional, and a first layer of the fibers of the reinforcement are deposited parallel to the longitudinal axis of the chuck.

9. The method according to claim 8, wherein a second layer of the fibers of the reinforcement cover the first layer of the fibers of the reinforcement and are deposited at an angle less than 45 degrees with respect to the longitudinal axis of the chuck.

* * * * *